United States Patent [19]

Ryder et al.

[11] 4,146,055

[45] Mar. 27, 1979

[54] VALVE STRUCTURE

[75] Inventors: Francis E. Ryder, Barrington, Ill.; Michael D. Thomas, Arab, Ala.

[73] Assignee: Ryder International Corporation, Barrington, Ill.

[21] Appl. No.: 779,466

[22] Filed: Mar. 21, 1977

[51] Int. Cl.$^2$ .................................... F16K 11/085
[52] U.S. Cl. ...................... 137/625.41; 137/625.47; 251/312
[58] Field of Search ............... 137/625.41, 625.47; 251/310, 311, 366, 312

[56] References Cited

U.S. PATENT DOCUMENTS

| | | | |
|---|---|---|---|
| 1,529,529 | 3/1925 | Wojahn | 137/625.41 |
| 1,830,067 | 11/1931 | Mellers et al. | 137/625.41 X |
| 2,854,027 | 9/1958 | Kaiser et al. | 137/625.41 |
| 3,057,350 | 10/1962 | Cowley | 137/625.41 X |
| 3,276,472 | 10/1966 | Jinkens et al. | 137/625.41 X |
| 3,305,211 | 2/1967 | Pillips | 137/625.47 |
| 3,481,367 | 12/1969 | Deuschle | 137/625.47 |

*Primary Examiner*—Arnold Rosenthal
*Attorney, Agent, or Firm*—Olson, Trexler, Wolters, Bushnell & Fosse, Ltd.

[57] ABSTRACT

There is disclosed a valve comprised of a valve body defining a cavity with inlet and outlet port means opening to and leading from said valve cavity. A plug member is rotatably disposed in said valve cavity and spaced from the bottom wall thereof to define a valve chamber, with the outlet port means leading from said chamber. The plug member includes an end segment disposed in said valve cavity and provided with a pair of concave, axial elongate surface portions opening to the end face of said segment, with said concave portions being separated by convexed surface portions. The concaved surface portion cooperates with the inner wall surface of the cavity to define a pair of relatively movable channels which can be placed in communication with the inlet port means to interconnect said inlet ports with the valve chamber. The segment of the plug disposed in said valve cavity is constructed from a resilient material, and of a slightly larger diameter than the valve cavity. Accordingly, the plug segment is resiliently deformed upon assembly, with the convexed surface portions in sealing engagement with the cavity walls to effect blockage of the inlet port means, when desired, and also to maintain separation between any liquid products in said channels.

10 Claims, 12 Drawing Figures

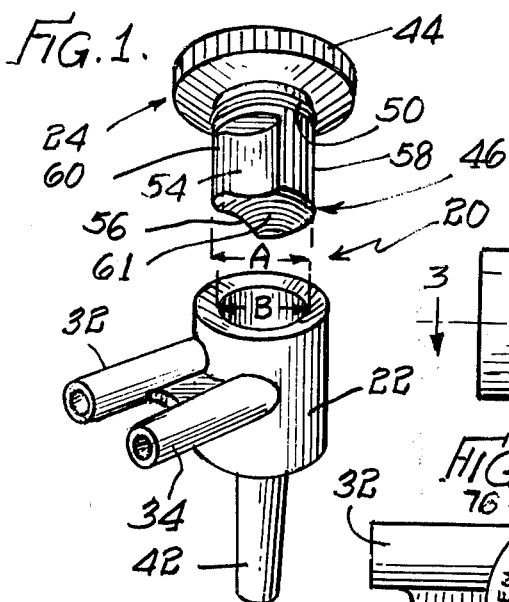
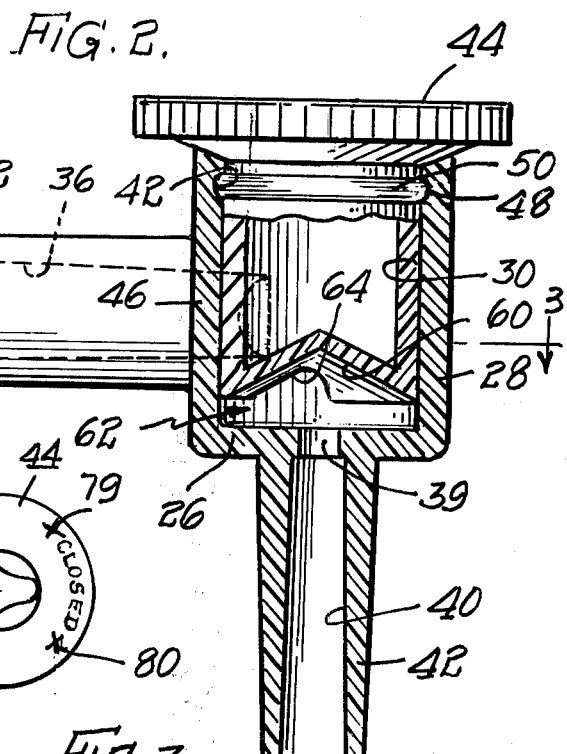
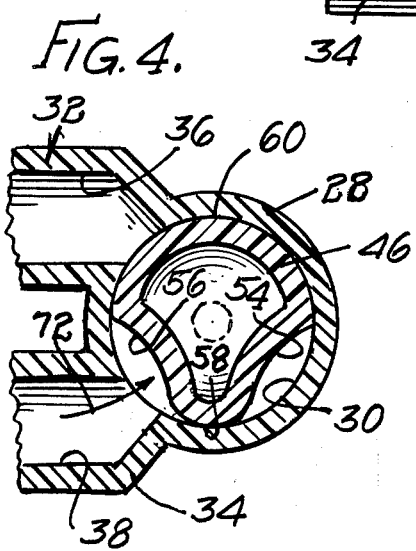
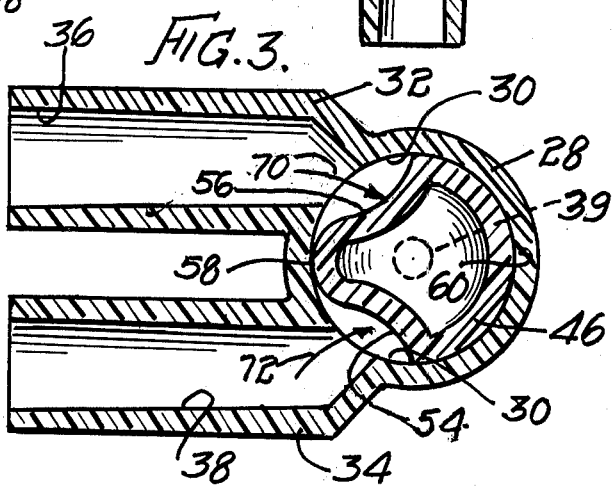
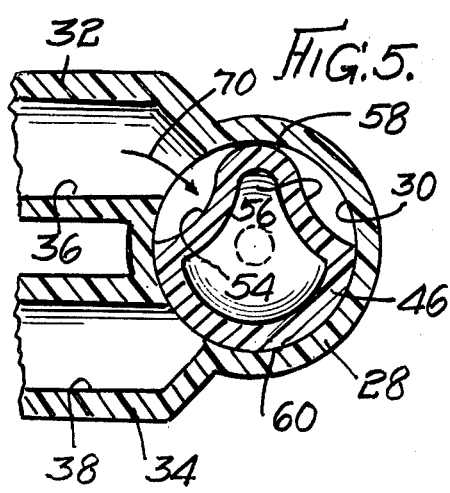
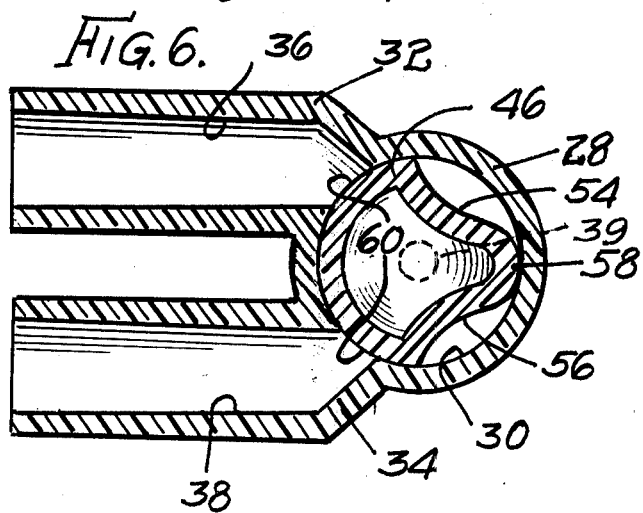

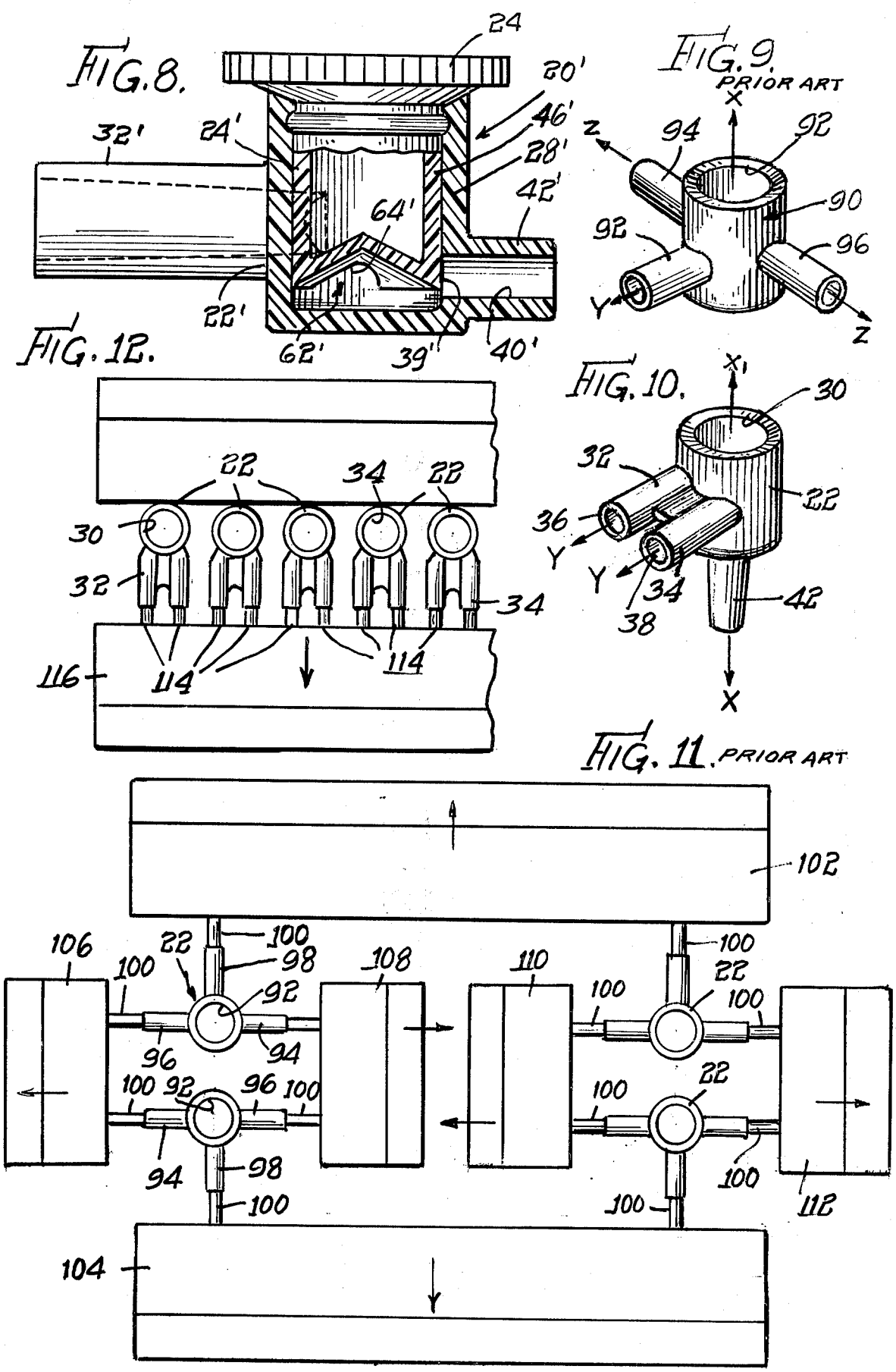

VALVE STRUCTURE

BACKGROUND OF THE INVENTION

The present invention is concerned with a valve construction, and more particularly with a valve adapted for use in the intravenous supply of liquid products.

The valve of the present invention was designed for, and has particular utility with regard to, the intravenous supply of fluids to a patient. More specifically, it is a relatively common medical practice, to establish an intravenous connection with a patient, and through the use of a multi-port valve connected to said supply tube, administer fluid products such as blood, blood plasma, medications, etc. to the patient. Application of the fluid product is normally done through the use of gravity with the supply vessels for the fluid products suspended above the patient, and a clamp or pinched valve used to regulate the rate of flow to the patient. In addition to the clamp or pinch valve, a multi-port valve is normally connected to said supply tube above the pinch valve, which enables the selective supply of one or more fluid products. Examples of valves of this type, which are termed "I.V. valves," can be found in U.S. Pat. Nos. 3,481,367 and 3,750,704.

Since the medications supplied to one patient, might not be compatable with another, the I.V. valves must be cleaned and sterilized before it can be reused. This however is not practical, thus, in many instances, the I.V. valves are merely discarded. As can be appreciated, the cost of these I.V. valves can become a significant factor, and efforts have been made, as noted in the above-mentioned patents, to provide relatively inexpensive, disposable I.V. valves.

While the prior art attempts mentioned above have been partially successful, the present invention provides an improved, extremely simple and ingenous approach to the design and production of a disposable, intravenous valve. As will become clear from the discussion to follow, the present invention enables an I.V. valve to be fabricated inexpensively, and from but two molded parts which have been designed not only to minimize the cost of production tooling, but also to maximize the number of parts which can be molded during each cycle of the injection molding apparatus. These features will of course reduce the production cost for each valve. In addition, the structural features of the present invention provide a novel approach to the problem of multi-port selective valving.

More specifically, the present invention provides a valve body which includes a substantially cylindrical valve chamber into which the inlet and outlet ports open. A plug member of unique design is disposed in said valve chamber for rotation with respect thereto. The plug member includes an end segment that may be spaced from the bottom of the valve cavity to define therewith a valve chamber, and, in the preferred, illustrated embodiment is hollow. One or more axially elongate, concave portions are formed in the end segment, with the remainder of the surface portion of the end segment being of an arcuate convex configuration. The end segment is fabricated from a relatively flexible material and is of a diameter slightly larger than the diameter of the valve cavity. Accordingly, upon assembly the end segment will be resiliently deformed, with the resulting resiliency forcing the convexed surface portions of the end segments into tight sealing engagement with the cavity surface wall. Correspondingly, the concave portions of the end segment will cooperate with the valve cavity surface wall to define axially extending channels opening to the valve chamber. Accordingly, by the selective rotative positioning of the plug member, one or the other or both of the inlet ports may be interconnected with the valve chamber, or alternately blocked as may be desired.

As an additional feature, the present invention also contemplates the employment of a valve body wherein the outlet port axis is aligned with either the valve cavity axis or the axes of the inlet port. Accordingly, during molding of said valve body, only a single side action for retraction of the mold cores will be required. That is to say, that the parting of the mold halves will pull the necessary cores in a first general direction, for example along the X axis, with the single side action pulling the necessary cores along the Y axis. This is a significant improvement over the prior art designs of the above-mentioned type, wherein the inlet and outlet ports are disposed along one pair of axes, i.e X and Y, with the valve cavity disposed along a third axis. Accordingly, in the molding operation at least two side actions are required to pull the cores used to form the bores. This materially reduces the number of valve bodies that can be molded with each cycle of the injection molding machine, and most importantly, complicates the design of and increases the cost of the production tooling.

In addition to the above specifically discussed features and advantages of the invention, other such features and advantages will become apparent from the detailed description of the preferred embodiment which follow hereinafter in conjunction with the drawings.

DESCRIPTION OF THE DRAWINGS

FIG. 1 is a perspective, exploded view of a valve constructed in accordance with the present invention.

FIG. 2 is a sectional view of the valve of FIG. 1 in the assembled condition with the valve plug position to establish communication between both inlet ports and the outlet port.

FIG. 3 is a sectional view taken along the line 3—3 of FIG. 2;

FIG. 4 is a sectional view similar to FIG. 3 and illustrating the condition existing upon rotation of the valve plug 90° in the counter-clockwise direction from FIG. 3;

FIG. 5 is a sectional view similar to FIG. 3, with the valve plug rotated 90° in the clockwise direction from the position as shown in FIG. 3;

FIG. 6 is a sectional view similar to FIG. 3, with the valve plug rotated 180° from the position of FIG. 3.

FIG. 7 is a top plan view of the assembled valve;

FIG. 8 is a partial sectional view similar to FIG. 2, but illustrating an alternate form of the present invention;

FIG. 9 is a perspective, view of a prior art type 10 of valve body, indicating three axes along which the bores and cavities extend;

FIGS. 10 and 11 are perspective views of the valve body embodiments of FIGS. 1 and 8 respectively, and illustrating the two axes along which the bores extend;

FIG. 11 is a schematic representation of the mold, side action arrangement required for the prior art valve bodies of FIG. 9;

FIG. 12 is a schematic representation of the mold, side action arrangement required for the present invention.

DESCRIPTION OF THE ILLUSTRATED EMBODIMENTS

Referring now to the drawings, a valve constructed in accordance with the present invention is illustrated in FIG. 1, and designated generally 20. The valve 20 is comprised of a main valve body 22 and a plug member 24 rotatably assembled to said body. Initially, consideration will be directed to the structural features of the valve body 22 and the valve plug 24, respectively, with a more detailed discussion of how the structural features cooperate being provided in conjunction with a discussion of the overall operation of the valve 20 of the present invention.

Valve body 22 includes a generally cylindrical, axially extending wall structure 28 having one end thereof closed by a bottom or base wall structure 26 with the opposite end thereof being open. A valve cavity 30 is thus provided by said base wall 26 and axial wall structure 28, with said valve cavity 30 having a substantially cylindrical inner wall surface.

Inlet port means for delivery of liquid product to the valve body 20 are provided, and these open through the inner wall surface of the valve cavity 30. In this regard, a pair of elongate, generally parallel, tubular projections 32 and 32 are formed integral with the axial wall structure 28 and include central bores 34 and 38 respectively, opening into the valve cavity 30, as can be seen in FIG. 3. In the form of the invention as illustrated in FIGS. 1-7, an outlet port 39 is formed in the base wall 26 and is in communication with a bore 40 of a tubular projection 42. The tubular projections 32 and 34 enable the supply lines from separate fluid containing vessels (not shown) to be connected to the valve 20, while the outlet projection 42 is for connection to the intravenous supply tube (also not shown).

The valve plug 24 includes an enlarged head portion 44 and an axially extending end segment 46 which is received in the valve cavity 30 upon assembly. Enlarged head portion 44 provides for the manual rotation of the valve plug 24, for a purpose to be explained more completely hereinafter.

The end segment 46 includes one or more, and preferably two elongate, concaved surface portions 54 and 56. These surface portions 54 and 56 are separated, each from the other, by a first elongate arcuately convexed surface portion 58, and a second convexed surface portion 60. As can be seen in FIG. 3, the arcuately convexed surface portion 60 has a circumferential extent which is substantially greater than the circumferential extent of the portion 58. More specifically, and for a purpose to become clear hereinafter the circumferential extent of the convex portion 60 is designed to be greater than the maximum circumferential distance between the inlet ports 36 and 38 as measured along the wall surface of cavity 30. The circumferential extent of the convex surface 58 is designed to be less than the minimum circumferential spacing between said inlet and outlet port 36 and 38. Also, for purpose to be detailed hereinafter, it should be noted that the end face 61 of the end segment 46 is concaved.

The assembled condition for the valve plug 24 and valve body 22 are best illustrated in FIGS. 2 and 3. In order to maintain assembly, the cavity 30 is provided with a circumferential groove 48, into which an annular rim 50 on the end segment 46 engaged with a snap-fit type of relationship. This snap-fit precludes inadvertent separation of the parts, yet permits the valve plug 24 to rotate relative to the valve body.

In a preferred form of the invention, the length of the end segment 46 is less than the depth of the cavity 30. Accordingly, in the assembled condition the end face 61 will be spaced from the base wall 26 and thereis in effect provided a valve chamber, designated generally 62. The outlet port 39 communicates with and leads from said valve chamber 62.

With reference to FIG. 1, it can be seen that the concave surface portions 54 and 56 have their upper ends closed, while the lower ends thereof open to the concavity which provides the end face 61. Accordingly, upon assembly the wall surface of cavity 30 will overlie the concave surface portions 54 and 56 to define a pair of spaced, closed channels which lead to and open into the valve chamber 62.

As an additional feature, the major diameter "A" of the end segment 46, viz., the maximum diameter taken through the respective convex portions 60 and 58, is selected to be slightly greater than the diameter "B" of the cavity 30. Further, the end segment 46 is formed from a resilient material such as plastic. Therefore, upon assembly the end segment 46 will be resiliently deformed to conform to the dimensions of the cavity 30. This deformation is permitted due to the fact that the end segment 46 is hollow, with the resulting curved walls provided by the concave portions 54 and 56, bowing or flexing to permit a slight constricting of the end segment. Due to the resilient nature of material employed and the overall design, this deformation is not permanent, and the wall structure of the end segment 46 will tend to return to its original shape. This resiliency will cause the convex surface portions 58 and 60 to be biased into firm sealing engagement with the cavity wall 30.

As an additional matter, the concaved end surface 61 also facilitates the above-discussed flexing of the end segment 46 upon assembly. It should be noted that the concave surface 61 intersects the elongate concaved surface portions 54 and 56, to define arcuate edges 64, best seen in FIG. 2. These edges 64 not only facilitate the above-mentioned flexing, but assures the provision of a path from the channels 54 and 56 to the valve cavity 62 should the end segment 46 engage the base wall 26.

Before considering the overall operation of the valve 20, attention is directed to FIG. 8, where an alternate form of the invention is disclosed, and designated 20'. In the embodiment of FIG. 8, the outlet port 38' is provided in the side wall 28' and communicates with a tubular segment 42'. The construction of the valve plug 20' is identical so as to provide a valve chamber 62' with the port 38' leading from said valve chamber. The operation of the embodiment of FIG. 8 is identical to that of the embodiment of FIGS. 1-7 as will be discussed hereinafter.

The operation of the valve 20 will now be considered, and in this regard it must be kept in mind that the valve plug 20 is rotatable with respect to the valve body 22. With the valve plug 20 in the relative position as illustrated in FIGS. 1 and 2, the channels provided by the concaved surface portions 54 and 56 align with the inlet ports 36 and 38 with the convexed surface portion 58 engaging the surface wall of cavity 30 intermediate said ports. Accordingly, the fluid in the inlet port 36 can enter the valve cavity 30 as indicated by the arrow 70, and correspondingly the fluid in the inlet port 38 can also enter cavity 30 as indicated by the arrow 72. The fluids from the respective ports 36 and 38 will flow downwardly along the wall surface of the cavity 30 in the channels provided by the concaved surface portions 54 and 56 and will enter the valve chamber 62. From here the fluids will be mixed and will enter the outlet tube 42 through the outlet port 39 for delivery to the patient.

Should it be desired to supply only the fluid from the inlet port 38, the valve plug 24 may be rotated 90° in a counter-clockwise direction from the position as shown in FIG. 3, to that of FIG. 4. When this is done, the arcuately convexed surface portion 60 will be brought in to overlying, blocking relation to the inlet port 36. Correspondingly, the concaved surface portion 56 will be moved into alignment with the inlet port 38, thereby maintaining a fluid path from said inlet port 38 to the valve chamber 62. If it is desired to supply only the fluid from the inlet port 36, the valve plunger 24 may be rotated 90° in a clockwise direction from that shown in FIG. 3, to that of FIG. 5. This movement will bring the convexed surface portions 60 into blocking relation to the inlet port 38, while the concave surface portion 54 will be moved into alignment with the inlet port 36, to maintain a fluid path from said inlet port 36 to the valve chamber 62.

Should it be desired to terminate the flow from both said inlet ports 36 and 38, the valve plug 24 may be rotated 180° from the condition as shown in FIG. 3, to that of FIG. 6. As will be recalled, the circumferential extent of the surface portion 60 is selected to be greater than the maximum distance between the ports 36 and 38 as measured along the cavity 30. Accordingly, in the condition of FIG. 6, the surface portion 60 will overlie and block both said inlet ports 36 and 38.

Thus, it can be seen by the selective, rotational positioning of the plug 24, fluid supply through the valve can be blocked, or supply from one or the other or both of the inlet ports 36 and 38 can be established with the outlet port 38. So as to provide a visual indication of the condition of the valve, indicia may be provided on the upper surface of the enlarged portion 44, as illustrated in FIG. 7. In this regard the arrows 76 and 78 correspond to the concave surface portions 54 and 56 and will indicate which inlet ports are opened for a given position of the valve plug. The X's 79 and 80 will indicate blockage of the inlet ports by the convexed surface portion 60.

Directing attention now to FIGS. 9-12, an additional feature of the present invention will be considered. As was discussed previously, the parts of the present invention have been designed to reduce the cost of production tooling, and to enable the fabrication of a greater number of parts with each cycle of the injection molding apparatus.

FIG. 9 illustrates a valve body of the general type contemplated by the prior art designs. In this regard the valve body that is designated generally 90 and includes a valve bore 92 disposed along the X axis, and at least three additional ports, 94, 96 and 98, two of which are inlet ports, and one an outlet port. Port 98 is disposed along the Y reference axis, while ports 94 and 96 are disposed along the Z reference axis.

In FIG. 10, the valve body 22 of the present invention is shown. In this regard the axis for the cavity 30 and the bores 39 and 40 of projection 42 extend along the X reference axis; while the axes for ports 36 and 38 of projections 32 and 34 extend along the Y axis. By way of comparison with the prior art type of body 90, of FIG. 9, it can be seen that none of the bores or ports of the valve body 22 extend along the Z reference axis.

A schematic representation of the molding apparatus for the prior art valve body 90 is shown in FIG. 11. In this regard, the side actions and grouping of the valve bodies 90 are shown, however, the respective mold halves which would part essentially in the plane of the drawings have not been illustrated. The parting of said mold halves, can be used to pull the mold cores for the cavities 92. The mold cores 100 from each of the tubular projections 94, 96 and 98, however, must be pulled by side actions, the structure for each being shown schematically at 102-112.

As can be appreciated, the necessity for the side actions 102-112, complicates and correspondingly increases the expense of the overall mold for the valve bodies 90. Further, due to the need for the side actions represented by structures 106, 108, 110 and 112, only a small number of said valve bodies 90 can be made with each cycle of operation of the injection molding apparatus.

A portion of the mold apparatus for the valve bodies 22 of the present invention is illustrated schematically in FIG. 12. In this regard, since the bores 30 and ports 36, 38, 39 and 40, of the valve bodies 22 extend along only the X and Y reference axes, the separation of the mold halves can be used to pull cores for bores 30 and ports 39 and 40 extending along the X reference axis of FIG. 10. To pull the cores 114 for the bores 36 and 38, of projections 32 and 34 along the Y reference axis, only a single side action structure 116 is required. With but a single side action, the cavities for the mold bodies can be closely grouped, as compared to the prior art design of FIG. 11, and a greater number of valve bodies molded with each operating cycle. Also, with but a single side action, the mold costs are reduced.

While several specific embodiments of the present invention have been described and shown in the drawings, this has been done to illustrate the overall concept of the invention, rather than limit said invention to those embodiments illustrated. It is envisioned that others skilled in the art may devise various modifications over the structural features shown, without departing from the spirit and scope of the invention. Accordingly, the claims appended hereto, taken in conjunction with the drawings and specification are intended to define the scope and extent of the invention.

The invention is claimed as follows:

1. A valve comprising a valve body including a base wall section and an axial wall section cooperating to define an open ended valve cavity having an inner wall surface; plug means rotatably mounted with respect to said valve body and including an end segment disposed in said valve cavity from the open end thereof, said end segment including a concave end face spaced from said base wall section to define a valve chamber; at least two inlet ports means communicating with said valve cavity through said axial wall section, said inlet port means being disposed generally parallel to each other and opening in the same direction, outlet port means communicating with said valve cavity at all times without regard for the relative position of said plug; said end segment having an outer wall surface which includes at least a pair of axially elongate concaved surface portions extending to the end face of said end segment, and separated by axially elongate convexed surface portions, the major diameter of said end segment being slightly greater than the diameter of said valve cavity, and said end segment being hollow and constructed of a resilient material, such that upon assembly said end segment will be resiliently and elastically deformed, with said concave surface portions facilitating said deformation, and the tendency of said end segment to return to its original condition forcing said convexed surface portions into sealing engagement with the wall surface of said valve cavity, said concaved portions cooperating with said inner wall surface upon assembly to provide a pair of separate channels opening to said valve chamber, said convex surface portions including a first portion having a circumferential extent greater than the maximum distance between said inlet port means and being in firm sealed contact with said valve cavity wall surface and adapted to overlie and block said inlet port means, and a second convexed surface portion having a circumferential extent less than the minimum distance between said inlet port means whereby said plug means can be rotated to select the relative position of said concaved and convexed surface portions with respect to said inlet port means, or said plug may be positioned with said concaved surface portions providing communication between said valve chamber and one, or the other, or both of said inlet port means.

2. A valve according to claim 1, wherein said second convexed portion is formed to a radius which is less than that of said valve cavity inner wall surface so that increased sealing pressure is exerted by said convex surface due to the resilient nature of said plug end portion.

3. A valve comprising a valve body including a base wall section and an axial wall section cooperating to define an open ended valve cavity having an inner wall surface; plug means rotatably mounted with respect to said valve body and including an end segment disposed in said valve cavity from the open end thereof, said end segment including a concave end face spaced from said base wall section to define a valve chamber; at least two inlet ports means communicating with said valve cavity through said axial wall section, outlet port means communicating with said valve cavity at all times without regard for the relative position of said plug; said end segment having an outer wall surface which includes at least a pair of axially elongate concaved surface portions extending to the end face of said end segment, and separated by axially elongate convexed surface portions, the major diameter of said end segment being slightly greater than the diameter of said valve cavity, and said end segment being hollow and constructed of a resilient material, such that upon assembly said end segment will be resiliently and elastically deformed, with said concave surface portions facilitating said deformation, and the tendency of said end segment to return to its original condition forcing said convexed surface portions into sealing engagement with the wall surface of said valve cavity, said concaved portions cooperating with said inner wall surface upon assembly to provide a pair of separate channels opening to said valve chamber, one of said convexed surface portions being formed to a radius which is less than that of said valve cavity inner wall surface, so that increased sealing pressure is exerted by said convexed surface due to the resilient nature of said plug end portion whereby said plug means can be rotated to select the relative position of said concaved and convexed surface portions with respect to said inlet port means, or said plug may be positioned with said concaved surface portions providing communication between said valve chamber and one, or the other, or both of said inlet port means.

4. A valve according to claim 3 wherein said outlet port is formed in said base wall section.

5. A valve according to claim 3, wherein said outlet port means is formed in said axial wall section.

6. A valve according to claim 5, wherein said outlet port means extends in a direction opposite to said inlet port means.

7. A valve according to claim 3, wherein said outlet port means is formed in said base wall, and said concaved surface on said end segment extends to the end face of said segment, with the intersection of said concaved surface portion and said concaved end face providing an arcuate edge portion, such that even if said end face is engaged against said base wall section and opening from said concaved surface to said concavity in said end face will be provided, said concaved end face aligning with said outlet port means.

8. A valve body according to claim 3, wherein said inlet ports includes a pair of tubular projections extending from and integral with the outer surface of said axial wall section, inner passage means formed in each of said projection and opening through said cavity wall surface to provide said inlet ports.

9. A valve according to claim 3, wherein the axis of said outlet port means is disposed generally parallel to the axis of said inlet ports.

10. A valve according to claim 3, wherein the axis of said outlet port means is disposed generally parallel to and in alignment with the axis of said valve cavity.

* * * * *